United States Patent [19]

Moeller et al.

[11] Patent Number: 5,856,470

[45] Date of Patent: Jan. 5, 1999

[54] OXIDATION PROCESS FOR PRODUCING POLYCARBOXYLATES FROM POLYSACCHARIDES

[75] Inventors: Thomas Moeller, Duesseldorf; Konrad Engelskirchen, Meerbusch; Herbert Fischer, Duesseldorf; Wolf-Eckart Noack, Essen, all of Germany

[73] Assignee: Henkel Kommanditgesellschaft auf Aktien, Duesseldorf, Germany

[21] Appl. No.: 913,797

[22] PCT Filed: Mar. 13, 1996

[86] PCT No.: PCT/EP96/01065

§ 371 Date: Dec. 29, 1997

§ 102(e) Date: Dec. 29, 1997

[87] PCT Pub. No.: WO96/29351

PCT Pub. Date: Sep. 26, 1996

[30] Foreign Application Priority Data

Mar. 22, 1995 [DE] Germany ................. 195 10 313.0

[51] Int. Cl.$^6$ .................................................. C07G 17/00
[52] U.S. Cl. ................................................................ 536/124
[58] Field of Search .............................................. 536/124

[56] References Cited

U.S. PATENT DOCUMENTS

| | | | |
|---|---|---|---|
| 2,472,590 | 6/1949 | Kenyon et al. | 260/209 |
| 3,967,975 | 7/1976 | Idaszak | 127/23 |
| 4,021,927 | 5/1977 | Idaszak | 34/10 |
| 4,664,839 | 5/1987 | Rieck | 252/175 |
| 4,820,439 | 4/1989 | Rieck | 252/135 |
| 5,541,316 | 7/1996 | Engelskirchen et al. | 510/471 |

FOREIGN PATENT DOCUMENTS

| | | |
|---|---|---|
| 1 036 455 | 8/1978 | Canada . |
| 0 164 514 | 12/1985 | European Pat. Off. . |
| 24 12 837 | 10/1974 | Germany . |
| 44 26 443 | 2/1996 | Germany . |
| WO93/16110 | 8/1993 | WIPO . |
| WO95/20608 | 8/1995 | WIPO . |

OTHER PUBLICATIONS

"Cellulose Chemistry and its Applications", John Wiley & Sons, Chichester, GB, Chap 10, 243–65 (1983).

*Primary Examiner*—Gary Geist
*Assistant Examiner*—Jafar Parsa
*Attorney, Agent, or Firm*—Ernest G. Szoke; Wayne C. Jaeschke; Real J. Grandmaison

[57] ABSTRACT

A process for producing polycarboxylic acids or salts thereof by contacting a polysaccharide with nitrogen dioxide and dinitrogen tetroxide at a charging temperature in the range from the boiling point of nitrogen dioxide under a particular pressure to a temperature which is 50° C. higher than said boiling point, oxidizing the primary alcohol groups of the polysaccharide at a temperature which is at least about 10° C. above said charging temperature to convert the primary alcohol groups into carboxyl groups, and optionally, at least partially neutralizing the carboxylic acid groups formed.

10 Claims, 5 Drawing Sheets

Phase N

Phase N+1

PHASE N

Phase N+1

Phase N+2

N2/NO2

OXIDATION PROCESS FOR PRODUCING POLYCARBOXYLATES FROM POLYSACCHARIDES

BACKGROUND OF THE INVENTION

1. Field of the Invention

This invention relates to a simplified process for the production of polycarboxylates by selective oxidation of polysaccharides with gaseous nitrogen dioxide.

2. Discussion of Related Art

Extensive knowledge exists on the production of polycarboxylates by oxidative treatment of polysaccharides, for example cellulose, starch and dextrins, cf. for example Houben-Weyl "Methoden der organischen Chemie", Thieme-Verlag, Stuttgart (1987), Vol. E 20, Makromolekulare Stoffe, subchapter entitled "Polysaccharid-Derivate" edited by Dr. K. Engelskirchen, loc. cit., pages 2042 et seq., more particularly pages 2124 et seq. (oxidation products of cellulose) and pages 2166 et seq. (oxidized starches), and the publication entitled "Cellulose Chemistry and its Applications" (1983), John Wiley & Sons, Chichester, GB, more particularly chapter 10 "Oxidation of Cellulose" by T. P. Nevell and the extensive literature cited therein, loc. cit., pages 262 to 265.

Roughly summarized, it may be said that several oxidizing agents are commonly used for the oxidation of polysaccharides, more particularly polyglucosans produced exclusively from glucose. They include, for example, (atmospheric) oxygen, hydrogen peroxide, sodium hypochlorite or bromite, periodic acid and periodates, lead (IV) acetate, nitrogen dioxide and cerium(IV) salts. These oxidizing agents react very differently with the anhydroglucose units, cf. for example the formula schemes in Houben-Weyl, loc. cit., page 2124. For example, periodates or lead(IV) acetate promote C-C cleavage of the anhydroglucose rings; so-called 2,3-dialdehyde cellulose is obtained from cellulose and dialdehyde starch is similarly obtained from starch. It is also known that, when cellulose is exposed to the action of nitrogen dioxide, oxidation of the primary alcohol group to the carboxyl group is by far the predominant reaction. The oxidizing agent, generally present in equilibrium with dinitrogen tetroxide, may be used in gaseous form or in solution in an inert organic solvent, cf. Houben-Weyl loc. cit., page 2125 and the primary literature cited in this connection therein. It is even possible starting out from starch to achieve substantially selective oxidations of the primary alcohol group of the anhydroglucose units to the carboxyl group. Thus, the oxidation of starch with gaseous nitrogen dioxide or nitrogen dioxide dissolved in water or in various organic solvents at room temperature/normal pressure is known from U.S. Pat. No. 2,472,590.

Under these conditions, the substantially complete conversion of the primary alcohol groups of the polysaccharides into carboxyl groups is only achieved after very long reaction times which can amount to several days. In addition, large amounts of nitrogen dioxide, based on the polysaccharide to be oxidized, are required in the known process.

A significant improvement in the production of such oxidation products of polysaccharides is known from International patent application WO 93/16110. The invention disclosed in this document is based on the observation that polycarboxylates can be obtained in high yields from polysaccharides by a simple process in which the oxidation reaction is carried out with nitrogen dioxide/dinitrogen tetroxide in the presence of oxygen at elevated temperature and preferably at elevated pressure. The expression "nitrogen dioxide/dinitrogen tetroxide" used in the document in question and in the present specification stands for the equilibrium mixture of nitrogen dioxide and its dimer, dinitrogen tetroxide, present under the particular reaction conditions.

When the variant of the solventless oxidation described in this document is carried out with gaseous nitrogen dioxide/dinitrogen tetroxide, it has been found that, in the start-up phase of the reaction at relatively low temperatures, a consumption of nitrogen dioxide/dinitrogen tetroxide can be measured without oxidation taking place to any significant extent. On the other hand, if very high temperatures are applied, hardly any oxidation at all takes place after a short time. These phenomena can be explained by assuming that an adsorption or absorption equilibrium is established before the oxidation reaction, although applicants would not want to be confined to this explanation. Whether chemisorptive or physisorptive processes or a combination of both are involved appears to be of no consequence.

DESCRIPTION OF THE INVENTION

On the basis of this hypothesis, it has been found that the reaction of polysaccharides with nitrogen dioxide/dinitrogen tetroxide can be carried out under particularly moderate conditions and in relatively short times if the reaction as a whole is carried out in several stages of which the first stage comprises contacting the polysaccharide with the nitrogen dioxide/dinitrogen tetroxide at low temperatures and a second stage comprises subjecting the charged polysaccharide to the actual oxidation reaction, optionally with no further introduction of nitrogen dioxide/dinitrogen tetroxide.

Accordingly, the present invention relates to a process for the production of polycarboxylic acids or salts thereof from polysaccharides by oxidation with gaseous nitrogen dioxide/dinitrogen tetroxide, the primary alcohol groups of the polysaccharides being at least partly converted into carboxyl groups, and optionally at least partial neutralization of the carboxylic acid groups formed, characterized in that nitrogen dioxide/dinitrogen tetroxide absorbed at least partly from the polysaccharide is introduced at a charging temperature in the range from the boiling point of the nitrogen dioxide under the particular pressure to a temperature 50° C. higher and in that primary alcohol groups are then oxidized to carboxyl groups at an oxidation temperature at least 10° C., preferably 10° C. to 40° C. and more preferably 15° C. to 30° C. above the charging temperature, optionally with no further introduction of nitrogen dioxide/dinitrogen tetroxide. If the required degree of conversion of the primary alcohol groups into carboxyl groups is not reached after a single completion of this cycle, the only partly oxidized polysaccharide may be subjected to the steps mentioned once more or even several times after corresponding cooling. The degree of conversion may readily be determined by determining the acid value of the oxidation product as described, for example, in International patent application WO 93/16110.

The oxidation step is preferably carried out at temperatures of 40° to 80° C. and, more preferably, at temperatures of 45° to 70° C. where normal pressure is applied. Oxygen may be present either on its own or in the form of a mixture with a gas inert under the reaction conditions which may be added once at the beginning of the oxidation reaction or several times, if desired continuously, during the reaction. If it is carried out in this particular way, the oxidation reaction may be controlled as a function of temperature or pressure through the introduction of oxygen. In a preferred embodiment, the addition of oxygen is controlled in such a way that the oxidation temperature remains in the range from 40° C. to 80° C.

Suitable inert gases, i.e. gases which do not react under the particular process conditions required, are noble gases, such as helium or argon, and carbon dioxide, but especially nitrogen, nitrogen monoxide and dinitrogen monoxide and mixtures of these gases. The oxygen content of the gas mixture is preferably in the range from 1% by volume to 30% by volume and more preferably in the range from 3% by volume to 10% by volume. In one preferred embodiment of the process according to the invention, the oxygen is introduced in the form of air.

The process according to the invention is preferably carried out in the form of a fluidized bed oxidation process, the powder-form polysaccharide to be oxidized forming a fluidized bed through which a fluidizing agent at least periodically containing nitrogen dioxide/dinitrogen tetroxide flows. Accordingly, the present invention also relates to the use of fluidized bed reactors in a process according to the invention. In the context of the invention, a fluidized bed is understood to be the phenomenon observed when gases known as fluidizing agents flow from beneath through fine-particle loose material arranged on horizontal perforated plates, although the invention is by no means limited to this form of fluidization. According to the invention, one such process known from International patent application WO 93/16110 can be modified to the extent that, at the beginning of the addition of the nitrogen dioxide/dinitrogen tetroxide, the reactor temperature is kept, for example by internal heat exchangers, at the charging temperature in the range from the boiling point of the nitrogen dioxide under the particular conditions to a temperature 50° C. higher until at least partial absorption has occurred, after which the temperature is increased by at least 10° C., more particularly by 10° C. to 40° C. and preferably by 15° C. to 30° C. to a temperature at which the actual oxidation reaction takes place. However, the fluidized bed reactor for the actual oxidation reaction (oxidation reactor) is preferably preceded by another fluidized bed reactor which is kept at a correspondingly lower temperature, for example by internal heat exchangers, and in which the polysaccharide to be oxidized is charged with nitrogen dioxide/dinitrogen tetroxide (charging reactor). After charging, the polysaccharide can be removed from the charging reactor and transferred to the oxidation reactor.

In the interests of substantially continuous operation, however, it is simpler if, after removal of the oxidized product from the oxidation reactor, the oxidation reactor is filled with uncharged polysaccharide, the charged polysaccharide remains in the charging reactor and the temperature and flow conditions of the two reactors are interchanged so that the charging reactor of phase N becomes the oxidation reactor of phase N+1 while the oxidation reactor of phase N becomes the charging reactor of phase N+1. Through the corresponding interchange to be carried out in the next phase, phase N+2 corresponds to phase N.

BRIEF DESCRIPTION OF THE DRAWINGS

This quasi-continuous process is illustrated in FIGS. 1 and 2. In phase N of the process (FIG. 1), reactor 1 corresponds to the oxidation reactor while reactor 2 corresponds to the charging reactor, nitrogen dioxide/dinitrogen tetroxide as sole fluidizing agent or as part of an inert-gas-containing fluidizing agent being delivered to the oxidation reactor kept in the higher temperature range ($T_{ox}$) mentioned above and unused nitrogen dioxide/dinitrogen tetroxide—after leaving the oxidation reactor—being delivered to the charging reactor kept at the charging temperature in the range from the boiling point of the nitrogen dioxide to a temperature 50° C. higher $T_{charge}$. If desired, the fluidizing agent—after leaving the oxidation reactor—may leave the reactor without recycling, in which case nitrogen dioxide/dinitrogen tetroxide as sole fluidizing agent or as part of an inert-gas-containing fluidizing agent must also be introduced into the charging reactor from outside. The fluidizing agent leaving the charging reactor with very little, if any, nitrogen dioxide/dinitrogen tetroxide, particularly if it has flowed through the oxidation reactor beforehand, may be delivered to a unit for reoxidizing the nitrogen dioxide and subsequently recycling it to the oxidation reactor or to a disposal facility. After the product has been removed from reactor 1 and new polysaccharide has been introduced into the reactor 1 phase N+1 where the charging step takes place in reactor 1 and the oxidation step in reactor 2 is arrived at by lowering the temperature in reactor 1 to $T_{charge}$ and raising the temperature in reactor 2 to $T_{ox}$ and reversing the valves 4, 5, 6, 7 and 8, as illustrated in FIG. 2. If desired, condensers for removing the water of reaction may be built into the pipes connecting the reactors in order to avoid moisture-induced agglomeration of the polysaccharide, particularly where the reactors are switched several times in succession.

For a given polysaccharide and nitrogen dioxide content in the fluidizing agent, the times required in the described process are essentially determined by the required degree of oxidation and the temperature. As a guide, 18% to 22% of the primary alcohol groups are converted into carboxyl groups after 30 minutes, 60% to 70% after 60 minutes and 85% to 95% after 1.5 hours at a temperature $T_{ox}$ of 50° C./normal pressure using 12 mole equivalents of nitrogen dioxide per hour, based on the hydroxyl groups to be oxidized. Normally, the oxidation step may be terminated after about 2 to about 5 hours. The charging step may be carried out over a period of about 2 to about 5 hours and, more particularly, over a period of about 3 to about 4 hours.

A variant of the process illustrated in FIGS. 1 and 2 is obtained by adding on an aftertreatment step so that the reaction completed as described above is only continued until only at most 90%, preferably only 60% to 85% and, more preferably, only 65% to 80% of the required degree of oxidation, i.e. the degree of conversion of the primary alcohol groups into carboxyl groups is reached and the required degree of oxidation is only fully reached in a post-oxidation step, i.e. after the addition of nitrogen dioxide/dinitrogen tetroxide has stopped and at a temperature ($T_{post}$) at least 10° C., preferably 15° C. to 80° C. and, more particularly, 20° C. to 50° C. higher compared with the oxidation step, as described in hitherto unpublished German patent application P 44 26 443.7. In this post-oxidation step, it is important to ensure that an upper temperature limit of 160° C. is not exceeded because decomposition was increasingly observed at higher temperatures. This variant of the process may be carried out in the arrangement illustrated in FIG. 1 by interrupting the introduction of nitrogen dioxide/dinitrogen tetroxide into the oxidation reactor when at most 90% of the required degree of oxidation has been reached, i.e. by introducing a fluidizing agent consisting solely of inert gas, and correspondingly increasing the temperature, i.e. by at least 10° C., to $T_{post}$. It can be simpler, particularly as charging takes place at the same time, to bring in another reactor (3), as illustrated in FIG. 3. In this reactor, the described post-oxidation step is carried out in phase N. Inert gas is introduced as fluidizing agent through the valve 13 into the reactor 3 kept at $T_{post}$ and, after leaving this reactor, can be delivered through the valve 14 to a disposal facility or, alternatively, may be introduced into the charging reactor in order not to lose any nitrogen dioxide desorbed in the postoxidation step.

A polycarboxylate produced by this variant of the process has a much lower exothermic energy potential than products produced without the postoxidation step which is another advantage of the invention. This has a favorable effect on its storage stability.

Figure 6:
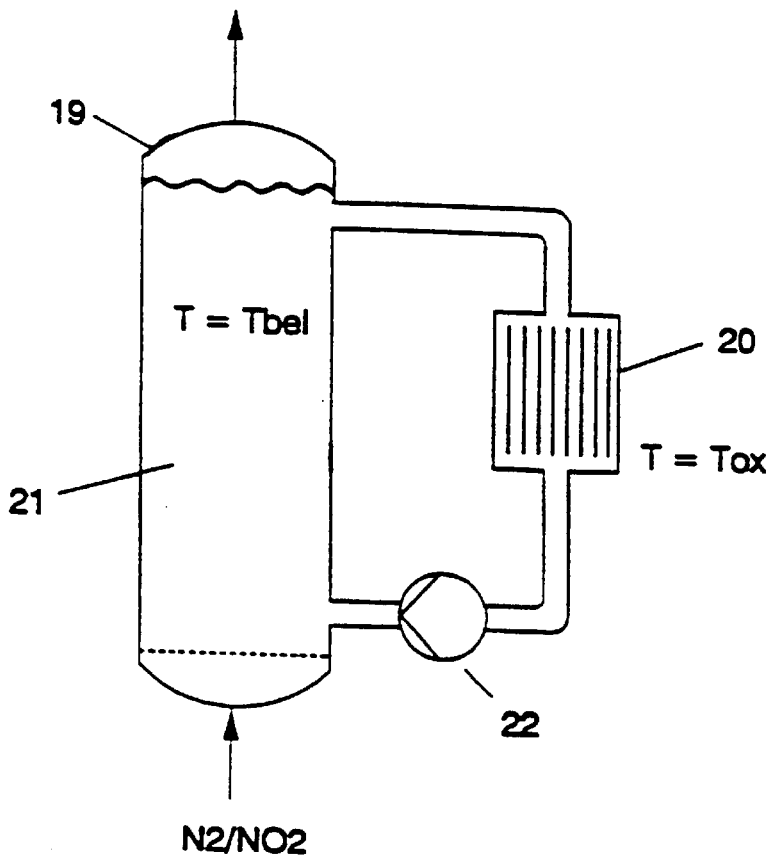

Another arrangement suitable for carrying out the process according to the invention is illustrated in FIG. 6. It consists essentially of a fluidized-bed reactor (19) with a parallel heat exchanger (20) which may be in the form of a plate-type heat exchanger. The fluidized bed 21 formed in the reactor through the introduction of nitrogen-dioxide-containing fluidizing agent is kept at the charging temperature, which is preferably in the range from 40° C. to 60° C. at normal pressure or at a pressure not significantly different from normal pressure, while the heat exchanger is at the oxidation temperature which is preferably in the range from 80° C. to 90° C. at normal pressure or at a pressure not significantly different from normal pressure. The outlet of the charging reactor 19 to the heat exchanger 20 is positioned below the upper edge of the polysaccharide fluidized bed 21 so that charged polysaccharide flows into the heat exchanger 20 and then passes back from there into the reactor 19. This can be made easier by a pump 22 in the form of a diaphragm pump. Whereas in an arrangement with no heat exchanger which otherwise corresponds to the described arrangement and which is operated at the oxidation temperature in the reactor under otherwise the same conditions, a reaction time of about 3.5 hours is required for complete oxidation, the reaction time required in the described arrangement is reduced to about 1.5 hours to about 2 hours.

Figure 7:
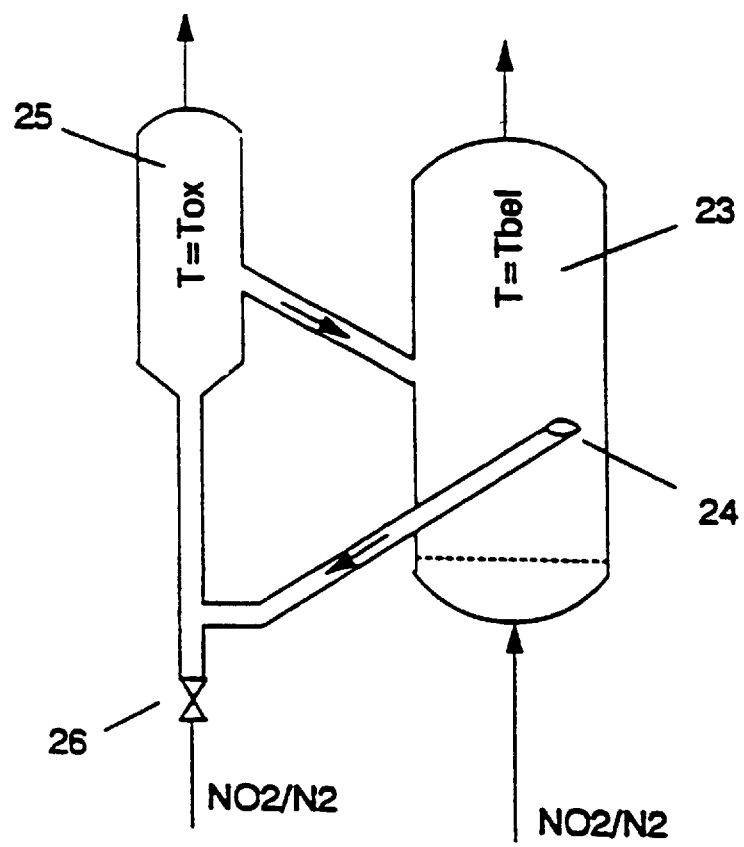

A variant of this procedure described with reference to FIG. 6 is embodied in the arrangement illustrated in FIG. 7. In this arrangement, a fluidized bed of polysaccharide is formed in the charging reactor 23 kept at $T_{charge}$ by means of the nitrogen-dioxide-containing fluidizing agent flowing from below. Material passes continuously from this fluidized bed through the pipe 24 and a pipe optionally incorporating a shutoff valve, into which fluidizing agent optionally containing nitrogen dioxide flows continuously through a valve 26, into the oxidation reactor 25 kept at $T_{ox}$ where a fluidized bed is also formed. At least partly oxidized polysaccharide passes continuously from the oxidation reactor 25 back into the charging reactor 23 through a pipe optionally incorporating a shutoff valve. This circulation of solids provides for a continuous interchange between charging and oxidation until the required degree of oxidation is reached. The fluidizing agent leaving the reactors 23 and 27 may be circulated as described above.

Figure 8:
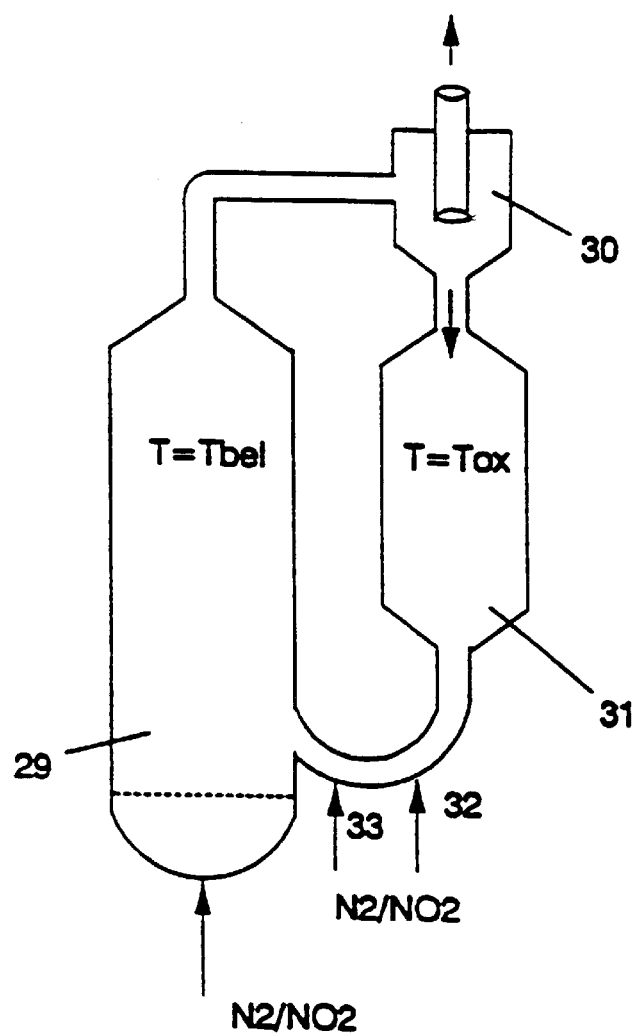

Another variant of the continuously circulating fluidized bed is embodied in the arrangement illustrated in FIG. 8. In this case, charged polysaccharide discharged at the top of the charging reactor 29 kept at $T_{charge}$ passes continuously with the fluidizing agent into the oxidation reactor 31 kept at $T_{ox}$ by means of a solid separator 30. In the oxidation reactor 31, the charged polysaccharide remains for a certain time in the fluidized bed produced by the stream of fluidizing agent entering at the opening 32. The same quantity of solids entering the fluidized bed of the oxidation reactor 32 through the solid separator 30 is continuously returned to the charging reactor 29 by the stream of fluidizing agent entering at the opening 33.

Figure 9:
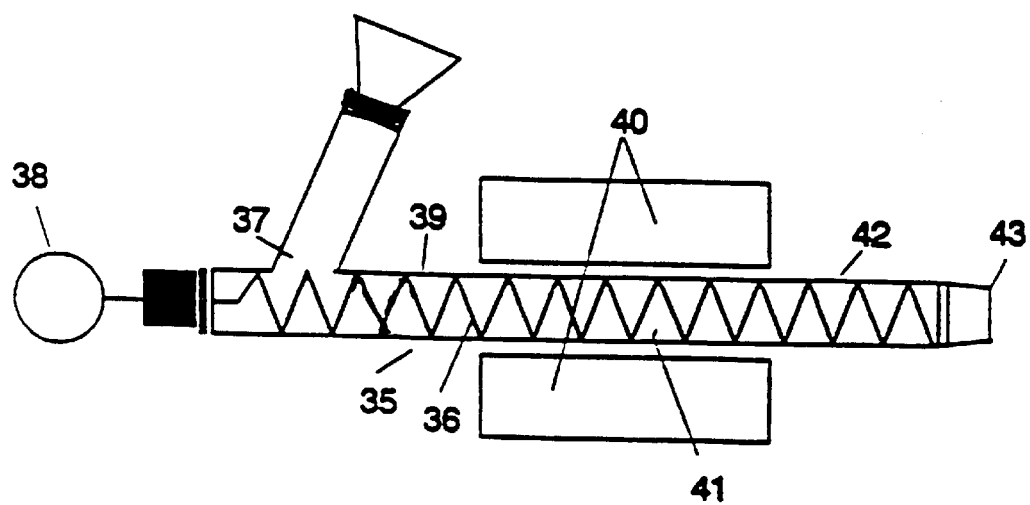

The process according to the invention can be carried out fully continuously by means of the arrangement illustrated in FIG. 9. This arrangement consists essentially of a tube reactor 35 with an internal feed spiral 36 which is filled with the polysaccharide to be oxidized at the opening 37. Nitrogen dioxide/dinitrogen tetroxide optionally containing inert gas is introduced through the valve 38. In the tube reactor section 39 kept at $T_{charge}$ the polysaccharide is charged with nitrogen dioxide. After passing through the charging zone 39, the charged polysaccharide enters the tube reactor section 41 (oxidation zone)—heated to $T_{ox}$ by a heating unit 40—in which the oxidation reaction takes place. The tube reactor section 41 may be followed by another section 42 (post-oxidation zone) which is kept at $T_{post}$. The oxidized product leaves the reactor through the opening 43 and may be separated from the gas, if desired by means of a solids separator.

The nature of the polysaccharide used is a largely non-critical factor in the oxidation process described above. The only requirements are that it should contain carbohydrate units containing primary alcohol groups and should be present in a form which enables it to be intensively mixed with the gaseous oxidizing agent and, optionaly, to form a fluidized bed, more particularly in powder form. Suitable polysaccharides are native polyglucans, more particularly starch and/or cellulose, and other polysaccharides, for example polygalactomannans, such as guaran and carubin. The polysaccharides may also be used in chemically or physically modified form providing they still contain oxidizable primary alcohol groups. By virtue of the particularly smooth reaction for which they provide and for economic reasons, starches varying in their provenance, more particularly potato starch, wheat starch, corn starch and/or tapioca starch, which are all commercially available in powder form, are preferred. Since cellulose often presents problems in the development of a fluidized bed on account of its fibrous character, it is preferably used in the form of a micropowder.

The process according to the invention, particularly where the polyglucans mentioned are used in its oxidation step, is preferably carried out over such a period that, on a statistical average, at least 15 mole-% of the oxidation product consists of oxidized anhydroglucose units corresponding to formula 1:

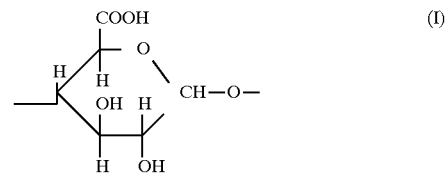

which corresponds to a carboxyl group content of at least 4% by weight.

The process according to the invention gives polyglucan-based polycarboxylates which preferably contain at least 25 mole-% and, more preferably, at least 35 mole-% of the oxidized anhydroglucose units, more particularly corresponding to formula 1, in the molecule, another advantage being that no significant quantities of other secondary oxidation products are present. The upper limit to the content of units corresponding to formula 1 is at 100 mole-% and, more particularly, at around 95 mole-%. Polycarboxylates containing from 70 mole-% to 100 mole-%, corresponding to a carboxyl group content of up to about 25% by weight, are preferably produced by the process according to the invention.

If the polysaccharide to be oxidized shows any tendency towards agglomeration and towards the phenomenon of "channel" formation so unwanted in fluidized bed technology, its flow behavior can be significantly improved by the addition of small quantities of, in particular, solid additives, including for example magnesium oxide, calcium fluoride, calcium phosphate, fine-particle zeolites or silica gel, more particularly the silicon dioxide marketed under the name of Aerosil®. Significant flow-improving effects are achieved with only small additions of, preferably, 0.1% by weight to 5% by weight and, preferably, 0.25% by weight to 1% by weight, based on the polysaccharide to be oxidized. The polysaccharide used preferably contains no more than 15% by weight and, in particular, no more than 10% by weight of water.

Following the oxidation and, optionally, post-oxidation reaction, the carboxyl groups of the oxidation product are at least partly neutralized by treatment with a basic reagent present in solid form, i.e. are partly converted from the acid form into the salt form. An aqueous solution containing alkali metal hydroxide, ammonium hydroxide and/or organic base is preferably used as the neutralizing agent. The neutralization step may also be carried out immediately after the oxidation reaction, for example by purging the reaction vessel with gaseous ammonia. Salt formation is also possible under reducing conditions, for example using sodium borohydride. The neutralizing agent is preferably used in such quantities that all the carboxyl groups of the oxidation product are converted into the salt form. The oxidation product may be added to the neutralizing agent or, alternatively, the neutralizing agent may be added to the oxidation product. Salt formation may also take place under the conditions under which the polycarboxylates are used or further processed in their acid form, for example during the production or use of detergents or cleaners by typical alkaline ingredients thereof.

The polycarboxylates produced by the process according to the invention are preferably used as builders or co-builders in detergents or cleaners. In formulations such as these, they are preferably used as cobuilders in quantities of 0.5% by weight to 10% by weight and, more particularly, in quantities of 2% by weight to 7% by weight, based on the total weight of the detergent/cleaner which contains an inorganic builder as its main builder. In a particularly preferred embodiment, they are used in detergents/cleaners which contain the zeolite NaA described in DE 24 12 837, for example in connection with laundry detergents, and/or the layer silicates described in European patent application EP 164 514 as principal builder and polycarboxylic acids or salts thereof produced by the process according to the invention in quantity ratios of 2:1 to 5:1. The composition of the detergents and/or cleaners may otherwise be selected virtually as required within the framework of known formulations.

EXAMPLES

Example 1

Starch was oxidized in an evaporator corresponding to the arrangement illustrated in FIG. 9. To this end, 187.3 g of potato starch (moisture content 4% by weight) were mixed with 1.8 g of the flow aid Aerosil® 200 and the resulting mixture was introduced through the opening 37 into the reactor 35 (stainless steel tube, length 105 cm, internal diameter 1.6 cm) at such a rate that the $N_2O$ introduced through the opening 38 (in a quantity of 120 l/h) was at least partly absorbed. The internal stainless steel spiral 36 rotated at 50 revolutions per minute so that the charged starch passed through the oven 40 (heating zone approx. 50 cm long, temperature 140° C.) with a residence time in the oxidation zone 41 of about 1 to 2 minutes. The entire quantity of starch passed through the apparatus in about 25 minutes. The product was washed free from nitrate and nitrite with aqueous acetone, freed from water by washing with acetone and dried. An oxidation product with an acid value of 140 was obtained.

Example 2

1 kg of dry starch (moisture content 6% by weight) was introduced into a fluidized bed reactor with a parallel plate-type heat exchanger as illustrated in FIG. 6. The fluidized bed was heated to 40° C. and the plate-type heat exchanger to 80° C. A mixture of nitrogen and nitrogen dioxide in a ratio by volume of 1:1 (150 l/h $N_2$ and 150 l/h $NO_2$) was introduced into the apparatus. The apparatus was laid out in such a way that the outlet to the heat exchanger was located below the upper edge of the fluidized bed so that starch always flowed into the plate-type heat exchanger from which it was pumped back into the fluidized bed by a diaphragm pump. The pumping rate was adjusted in such a way that the contents of the reactor were circulated once every 15 minutes to 30 minutes. Steps were taken to ensure that the temperature in the fluidized bed never exceeded 60° C. and the temperature in the heat exchanger did not exceed 80°–90° C. After a reaction time of 2 hours and working up as in Example 1, a powder-form oxidation product with an acid value of 285 was obtained.

Example 3

Figure 1:
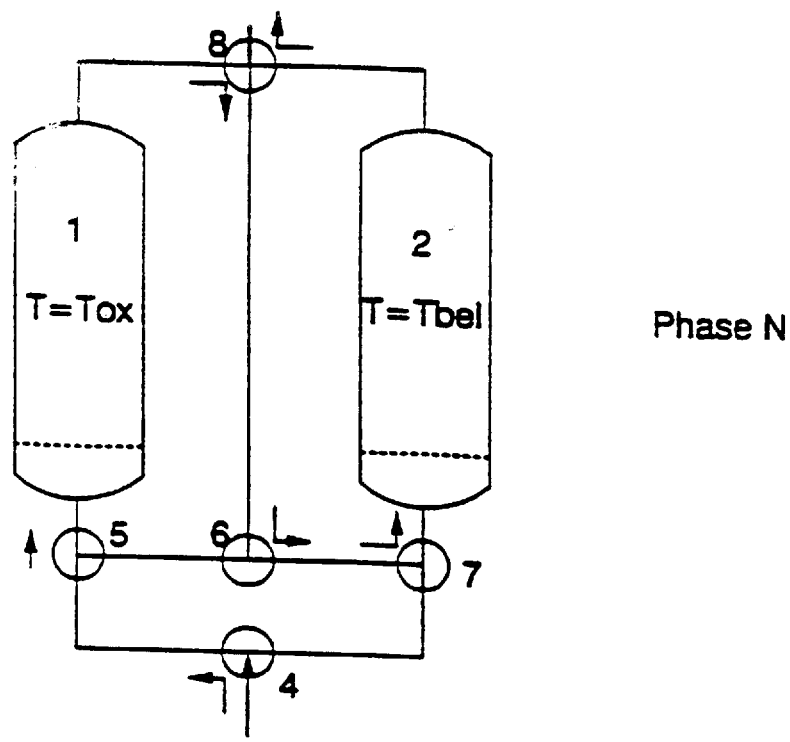
Figure 2:
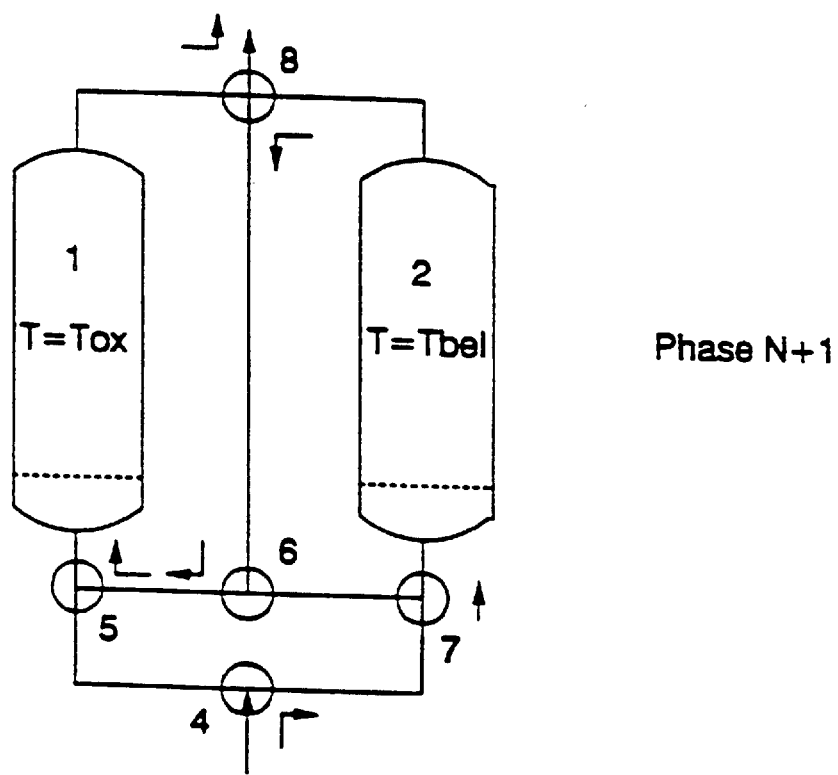
Figure 3:
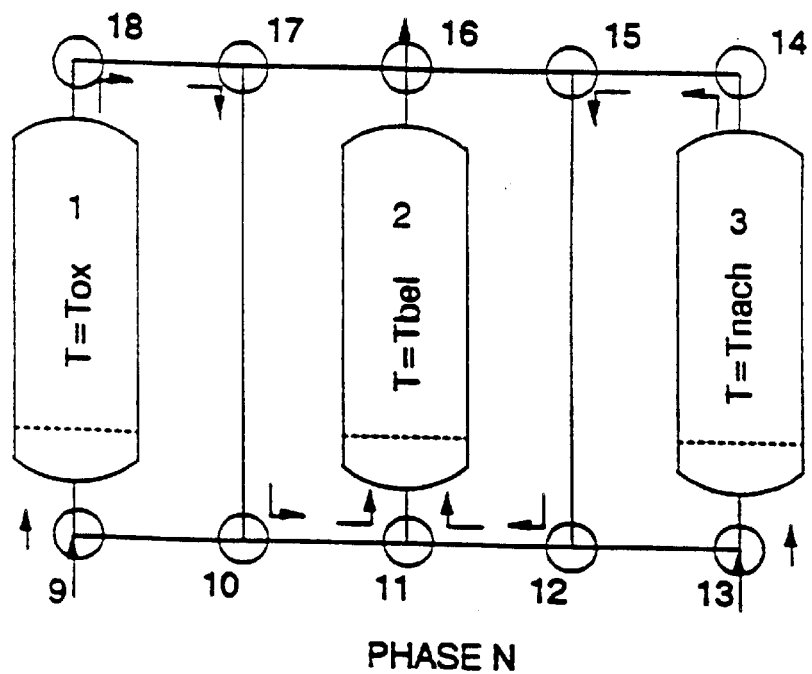
Figure 4:
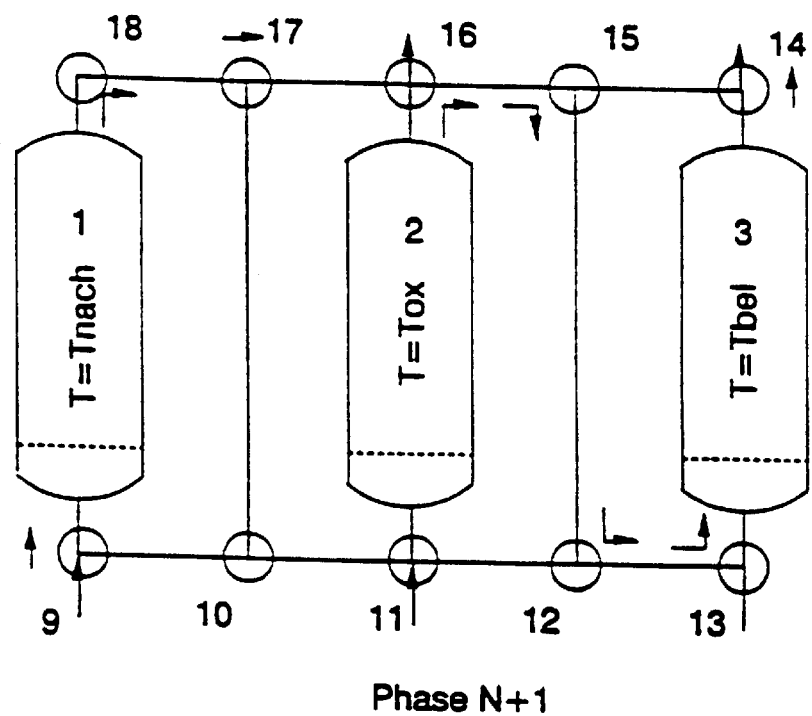
As illustrated in FIG. 4, the postoxidation step is carried out in reactor 1, the oxidation step is carried out in reactor 2 and the charging step is carried out in reactor 3 in phase N+1 after removal of the oxidized product from reactor 3 and charging of this reactor with polysaccharide to be oxidized, corresponding reversal of the valves, raising of the temperature in reactor 1 to $T_{post}$ and in reactor 2 to $T_{ox}$ and lowering of the temperature in reactor 3 to $T_{bel}$. A corresponding procedure then leads to the charging step in reactor 1, the post-oxidation step in reactor 2 and the oxidation step in reactor 3 in phase N+2 (FIG. 5). The following phase after corresponding reversal then corresponds to phase N again. An approximate value for the duration of the post-oxidation step is about 30 minutes to about 60 minutes.
Figure 5:
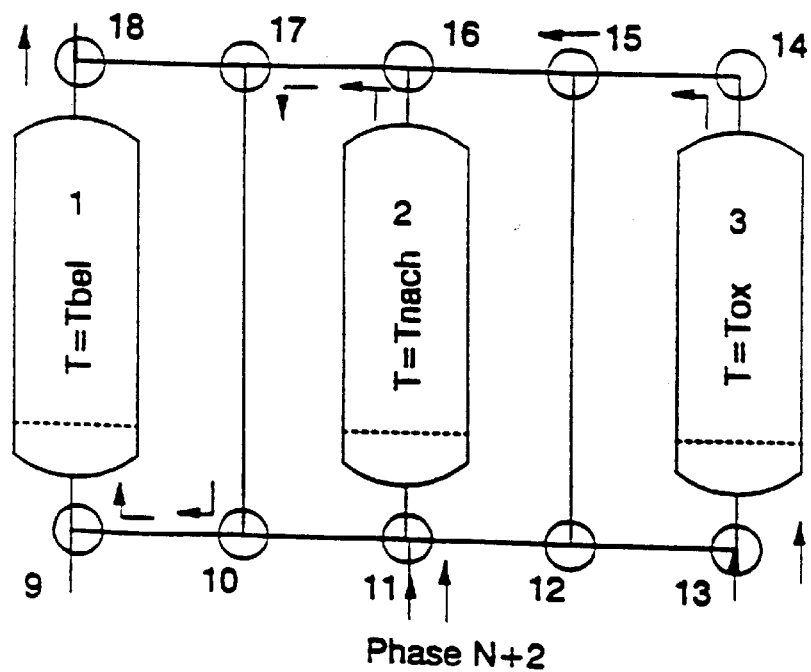

Starch was oxidized in an apparatus corresponding to the arrangement illustrated in FIG. 3. To this end, quantities of 1043 g of potato starch with a moisture content of 7% by weight were mixed with quantities of 0.5% by weight of Aerosil® 200 and the resulting mixtures were introduced into the two reactors 1 and 2 (height 80 cm, internal diameter 90 mm). A quantity of nitrogen suitable for fluidization was passed through the reactor 1 and its internal temperature was adjusted to 48° C.

The apparatus was then switched over so that the gas stream introduced flowed first through the reactor 1, then through a condenser for condensing moisture and then through the reactor 2 (charging reactor). Nitrogen dioxide was then additionally passed through the fluidized bed of the reactor 1. The quantities of gas were adjusted through air-calibrated throughflow meters so that the readings were always 150 standard liters per hour. The internal temperature in the reactor 1 was adjusted to and kept at 50° C. by thermostatic control. The internal temperature in the reactor 2 was kept at 30° C.

After 3 hours, the apparatus was switched over so that the delivery of nitrogen dioxide to the reactor 1 was terminated. Reactor 2 was then directly charged with the above-mentioned gas mixture (150 standard liters per hour of nitrogen and nitrogen dioxide) for 3 hours. The gases issuing from reactor 2 (now the oxidation reactor) were passed through a reactor 3 (charging reactor) with the same dimensions as reactor 1 or 2 which had been charged beforehand with the above-mentioned mixture of potato starch and Aerosil® 200. The internal temperatures in reactor 2 (oxidation reactor) and reactor 3 (charging reactor) were kept at 50° C. and 30° C., respectively, by thermostatic control.

After the stream of nitrogen through reactor 1 had been switched off, the internal temperature in this reactor was increased in 30 minutes to 80° C. and kept at that level for 30 minutes. During this phase, the flow of nitrogen through reactor 1 (now the post-oxidation reactor) amounted to 150 standard liters per hour. After moisture had been condensed out, the gas mixture leaving reactor 1 was also delivered to reactor 3. Reactor 1 was then cooled to room temperature and the product was removed and characterized: acid value 310. Reactor 1 was now available for recharging with the abovementioned mixture of potato starch and Aerosil® 200.

After the oxidation phase in reactor 2, reactor 3 became the oxidation reactor and the product from reactor 2 was subjected to thermal aftertreatment (post-oxidation phase). The acid value of the product from reactor 2 was then 367.

After the oxidation phase and the thermal aftertreatment described above, the product from reactor 3 had an acid value of 362.

| List of reference numerals | |
|---|---|
| 1, 2, 3, 19 | Fluidized bed reactors |
| 4, 5, 6, 7, 8, 9, 10 | Valves |
| 11, 12, 13, 14, 15, 16 | |
| 17, 18, 22, 26, 38 | |
| 20 | Heat exchanger |
| 21 | Fluidized bed |
| 23, 29 | Charging reactors |
| 24 | Pipe |
| 25, 31 | Oxidation reactors |
| 30 | Solid separator |
| 32, 33 | Openings for fluidizing agent |
| 35 | Tube reactor |
| 36 | Feed spiral |
| 37 | Charging opening for polysaccharide |
| 39 | Charging zone |
| 40 | Heating unit |
| 41 | Oxidation zone |
| 42 | Post-oxidation zone |
| 43 | Removal opening for polysaccharide |

What is claimed is:

1. The process of producing polycarboxylic acids or salts thereof comprising introducing a polysaccharide to nitrogen dioxide and dinitrogen tetroxide at a charging temperature in the range from the boiling point of nitrogen dioxide under a particular pressure to a temperature which is 50° C. higher than said boiling point wherein the introduction of nitrogen dioxide and dinitrogen tetroxide is terminated when 60% to 85% of the required degree of conversion of said primary alcohol groups into carboxyl groups is reached and then oxidizing the primary alcohol groups of said polysaccharide at a temperature which is at least about 10° C. above said charging temperature to convert said alcohol groups into carboxyl groups, and optionally, at least partially neutralizing the carboxylic acid groups formed.

2. A process as in claim 1 wherein said oxidizing is carried out at a temperature of 10° C. to 40° C. above said charging temperature.

3. A process as in claim 1 wherein the temperature is increased by 15° C. to 80° C.

4. A process as in claim 1 wherein at least 15% of said primary alcohol groups of said polysaccharide are converted into carboxyl groups.

5. A process as in claim 1 wherein said oxidizing is carried out in a fluidized bed wherein the fluidizing agent is a gas containing nitrogen dioxide.

6. A process as in claim 1 wherein said polysaccharide is selected from the group consisting of potato starch, wheat starch, corn starch and tapioca starch.

7. A process as in claim 1 wherein it is carried out over such a period that, on a statistical average, at least 15 mole-% of the oxidation product consists of oxidized anhydroglucose units corresponding to formula l:

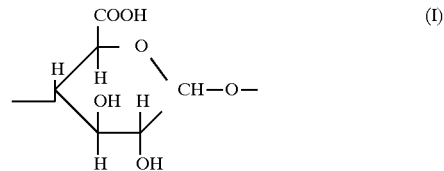

8. A process as in claim 7 wherein at least 25 mole-% of oxidized anhydroglucose units corresponding to formula l are obtained.

9. A process as in claim 1 wherein said oxidizing is carried out at a temperature of about 40° C. to 80° C. at normal pressure.

10. A process as in claim 1 carried out in a fluidized bed reactor.

* * * * *